US005701046A

United States Patent [19]

Kammerer et al.

[11] Patent Number: 5,701,046

[45] Date of Patent: Dec. 23, 1997

[54] PROCESS FOR THE PRODUCTION OF MULTI-LAYERED BRUSHES AND BRUSHES OBTAINED BY THE PROCESS

[75] Inventors: Eric Kammerer, Amiens, France; Lothar Biering, Frankfurt am Main, Germany; Erhard Grohs, Oberursel, Germany; Klaus Groht, Niddatal, Germany; Conrad Reynvaan, Bad Homburg, Germany; Horst Siegmund, Arnoldshain, Germany; Jorgen Spangenberg, Bad Vilbel, Germany; Arwed Uecker, Farmville, Va.

[73] Assignee: Le Carbone Lorraine, Courbevoie, France

[21] Appl. No.: 291,562

[22] Filed: Aug. 16, 1994

[30] Foreign Application Priority Data

Sep. 2, 1993 [FR] France .................................. 93 10881

[51] Int. Cl.$^6$ .......................... H01R 39/24; H02K 13/00

[52] U.S. Cl. .......................... 310/251; 310/248; 310/249; 310/252; 310/253; 29/826

[58] Field of Search .................................... 310/248, 249, 310/251, 252, 253; 29/826

[56] References Cited

U.S. PATENT DOCUMENTS

| | | | |
|---|---|---|---|
| 656,652 | 8/1900 | Markey | 310/251 |
| 2,636,856 | 6/1953 | Suggs et al. | 204/290 |
| 3,590,300 | 6/1971 | Moberly | 310/248 |
| 3,601,645 | 8/1971 | Whitehaert | 310/249 |
| 3,714,482 | 1/1973 | Lace | 310/228 |
| 3,980,914 | 9/1976 | Cunningham | 310/251 |
| 4,000,430 | 12/1976 | Bely et al. | 310/251 |
| 4,314,172 | 2/1982 | Diepers | 310/248 |
| 5,144,181 | 9/1992 | Shibuya | 310/254 |
| 5,285,126 | 2/1994 | Hoffmann et al. | 310/249 |
| 5,387,831 | 2/1995 | Yang | 310/242 |

FOREIGN PATENT DOCUMENTS

| | | | |
|---|---|---|---|
| 2616275 | 12/1988 | France | 310/242 |
| 9306573 | 6/1993 | Germany | 310/242 |
| 2038565 | 12/1978 | United Kingdom | 310/251 |
| 9007211 | 6/1990 | WIPO | 310/242 |

*Primary Examiner*—Steven L. Stephan
*Assistant Examiner*—Elvin G. Enad
*Attorney, Agent, or Firm*—Dennison, Meserole, Pollack & Scheiner

[57] ABSTRACT

The process comprising the charging into a mould (3) of at least one electrically conductive powder (4), the compression by means of a piston (5) of the contents of the mould to form a crude brush (7), the heat treatment of said crude brush (7) as well as the fixing of the ends of the electrical conductors (2), characterised in that the charging involves at least the simultaneous introduction of at least two conductive powders (4B, 4A and/or 4C . . . ) for obtaining a brush formed by integral blocks (1B, 1A and/or 1C . . . ), the junction (1AB and/or 1BC . . . ) between said blocks being orientated at least in part in the compression direction (13).

20 Claims, 9 Drawing Sheets

PROCESS FOR THE PRODUCTION OF MULTI-LAYERED BRUSHES AND BRUSHES OBTAINED BY THE PROCESS

SPHERE OF THE INVENTION

The invention relates to the sphere of brushes intended to produce electrical contact between an electrical supply and a rotating part (the commutator) of an electric motor.

PRIOR ART

Brushes consist essentially of a block of electrically conductive material which is sparingly abrasive towards the surface of the commutator, the block being in electrical contact with an electrical conductor, generally a copper braid or cable fixed to said block.

In numerous cases, the brush consists of the same material or of the same mixture of materials. However, multi-layered brushes are also known of which each of the layers has its own function.

Thus, French patent FR 2 093 513 describes a brush comprising a wearing block ending with a rapidly wearing wiping block having the curvature of the commutator. If this multi-layered brush is obtained by stacking two different powders in a mould and compressing them, the junction between the wearing block and the wiping layer is perpendicular to the compression direction.

French patent FR 2 009 196 also discloses a typical example of multi-layered brush consisting of two parts: a wearing block producing contact with the commutator and a layer of metal sintered on a surface of said block, an electrical conductor being fixed to the layer of sintered metal, mainly by soldering.

A brush of this type aims to improve the mechanical connection between the electrical conductor and the wearing block so as to reduce the risk of detachment of the conductor when it is subjected to a tensile stress. A brush of this type is typically obtained by stacking in a mould the conductive powder intended to form the wearing block then the powdered metal intended to form the layer of sintered metal.

Furthermore, European patent EP-B1-449 909 describes a process for the production of brushes consisting of a first carbonaceous material and carrying on one face a coating of a second carbonaceous material partially covering said face, the electricity-supplying conductor issuing from said first carbonaceous material via said face.

In this process, the second carbonaceous material is firstly precompressed to form a precompressed coating, then a die (or mould) is filled with powder serving to form said first carbonaceous material, said precompressed coating is subsequently placed on the surface of the mass of powder then said mass of powder and said precompressed coating are compressed and joined together using a punch and, at the same time, the ends of the electricity-supplying conductors are immersed in said mass of powder.

The production of a brush according to the prior art, whether or not multi-layered, comprises the following general stages:

- preparation of as many batches of conductive powders as there are layers to be stacked (mixtures of powders with a binder),
- successive charging of the powders or of one powder plus a powder precompressed in the patent EP-B1-449 909, into a mould so as to form a stack,
- compression of the powder (powders) optionally after having placed the electrical conductor at the top of the mould,
- heat treatment (baking/sintering),
- final machining.

PROBLEM POSED

Brush manufacturers encounter a certain number of problems which may be summarised under the following three headings:

- on the one hand it is necessary to develop and perfect brushes from the prior art so as to improve their overall performance (service life, wear of the commutators, reliability of the electrical connection, quality of commutation) and to adapt rapidly on the one hand to the developments in the techniques for producing electric motors and on the other hand to an ever greater diversity of applications of these electric motors and consequently of brush specifications.

Besides it may be necessary to limit the disturbances which may be caused by the brushes (noise, emission of parasitic electromagnetic waves, etc.) and therefore to adapt the brushes to current or future regulations.

On the other hand, it is a major concern of any industrialist such as brush manufacturers to minimise the quantity of waste of any type, in particular solid waste. Now the operation of machining brushes is a source of bulky solid waste. Typically, solid waste corresponds on average to 5 to 15% by weight dry equivalent of the materials used at the beginning of the production cycle.

Finally, contrary to other spheres considered as more technical, the brush sphere is a highly competitive sphere which is particularly exposed to customer pressure and is very sensitive with regard to prices, so a reduction in the cost price of the brushes, even by 5 to 10%, is a considerable economic advantage.

SUBJECT OF THE INVENTION

The invention relates firstly to a process for producing multi-layered brushes which simultaneously satisfies the three aforementioned requirements: improvement in the technical quality of the brushes and high flexibility or adaptability of the process/reduction of solid waste/reduction of the cost price.

The process according to the invention is an "open" process geared to versatility and adaptability of use in the sense that the same basic process can lead to a whole range of very different brushes while starting from the same basic principle so that this process allows "custom-made" functions adapted to each particular application to be incorporated in the brush and allows a technical and economic solution to the requirements of each customer to be found rapidly. The invention also relates to the brushes obtained by the process according to the invention.

DESCRIPTION OF THE INVENTION

According to the invention, the process for the production of multi-layered brushes equipped with electrical conductors and intended to produce electrical contact with the commutator of an electric motor involves the charging into a mould of at least one electrically conductive powder, the compression, by means of at least one piston, of the contents of the mould to form a crude brush, the heat treatment of said crude brush, as well as the fixing of the ends of said electrical conductors to said brushes, and is characterised in that the charging of said mould involves at least the simultaneous introduction of at least two conductive powders, each of the simultaneously introduced powders flowing through the upper orifice of said mould in a distinct flux of material owing to the separating means so as to obtain, after the compression stage and said heat treatment, a brush formed by integral blocks, each of the blocks comprising one of the powders introduced into the mould, the junction between said blocks being at least partially orientated in the compression direction.

During their research into brushes, the applicants found that, in numerous cases, it was worth producing a brush of which the wearing surface is parallel to the compression direction of the powders constituting the brush. In fact, the compression of the powders leads to orientation of the non-spherical particles (flakes of graphite) so that the material constituting the brush has anisotropy which could schematically be assimilated to that of a laminated material (the plane of the "lamellae" being perpendicular to the compression direction).

It is generally preferable, with regard to the technical performance of the brush, in particular the wear of the brush, if this plane of the "lamellae" is perpendicular to the wearing surface or if the wearing surface is parallel to the compression direction, which amounts to the same thing. According to one hypothesis, in the case of a wearing surface parallel to the compression direction, there would be less risk of detachment of the largest particles of the brush and, in particular, owing to the resultant electrical anisotropy, the commutation of the brush would be improved.

The obtaining of a wearing surface parallel to the compression direction is immediate in the case of a "single layer" brush. It is obtained by taking, as wearing surface, the face of the brush corresponding to one of the four lateral faces of the mould.

Furthermore, since stress analysis has directed the applicants to multi-layered brushes, the applicants have therefore had to develop a reliable process for obtaining, through a one step compression of powders, a brush according to the invention which meets the objectives aimed for.

Thus, the applicants had to develop a production process in which, contrary to prior art processes, they simultaneously introduced at least two powders into the mould.

The mastery of this simultaneous introduction of different powders enabled the applicants to meet all the objectives set, the problem having been, on the one hand, to conceive this method of operation as possible for a skilled man and, on the other hand, to find conditions for obtaining quality brushes.

During the entire mould filling phase, the process according to the invention allows a substantially flat filling front to be maintained consisting of the same number of distinct juxtaposed zones as there are simultaneously introduced powders, this separation into distinct zones resulting from the geometric configuration of said means of separation and the method of operation as will be seen hereinafter.

The boundary between two distinct blocks (or two zones if the section of two blocks is considered) has been called a "junction". Physically, a junction between two blocks of two different powders represents a thin layer at the limit of the two blocks within which the two said powders are mixed. The means according to the invention on the one hand allow the thickness of this layer to be generally limited to less than a few mm and typically less than 5 mm and preferably less than 2 mm, which is sufficient to achieve the objectives of the invention and, on the other hand, to obtain a junction having a "non-undulating" fixed position in the brush, this being just as important as a relatively thin junction layer thickness.

DESCRIPTION OF THE DRAWINGS

All the drawings illustrate the invention.

After the mould 3 has been filled to the desired height Ho, the piston 5 traversed by one end of an electric conductor 2 compresses the contents of the mould by means of a pressure P to the final height Hp, which allows a crude compressed brush 7 to be obtained, having a height substantially close to Hp and consisting of two integral blocks 7A and 7B.

Figure 1A:
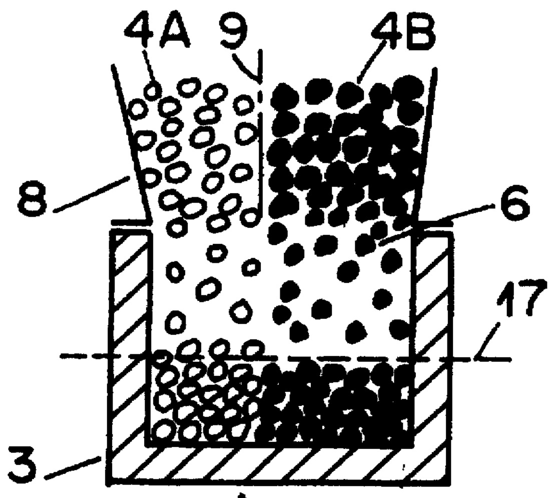
FIG. 1 is a section along the compression axis 13 of the various stages for the simultaneous charging of a mould 3 with two powders 4A and 4B flowing due to gravity from a hopper 8 provided with a partition 9 separating powders 4A and 4B, the filling plane 17 rising progressively to a predetermined height Ho.
Figure 1B:
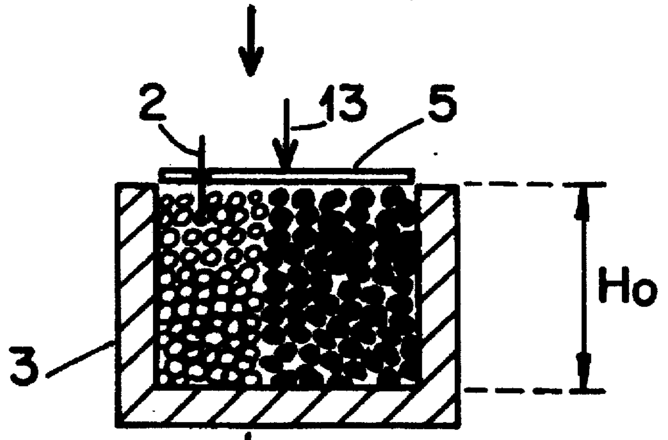
Figure 1C:
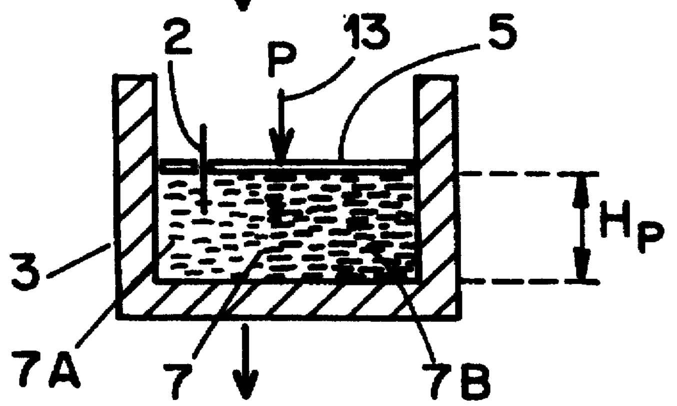
Figure 1D:
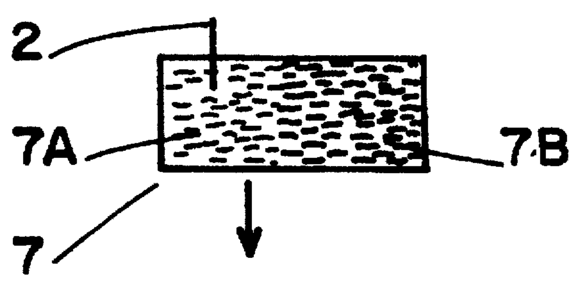
Figure 2A:
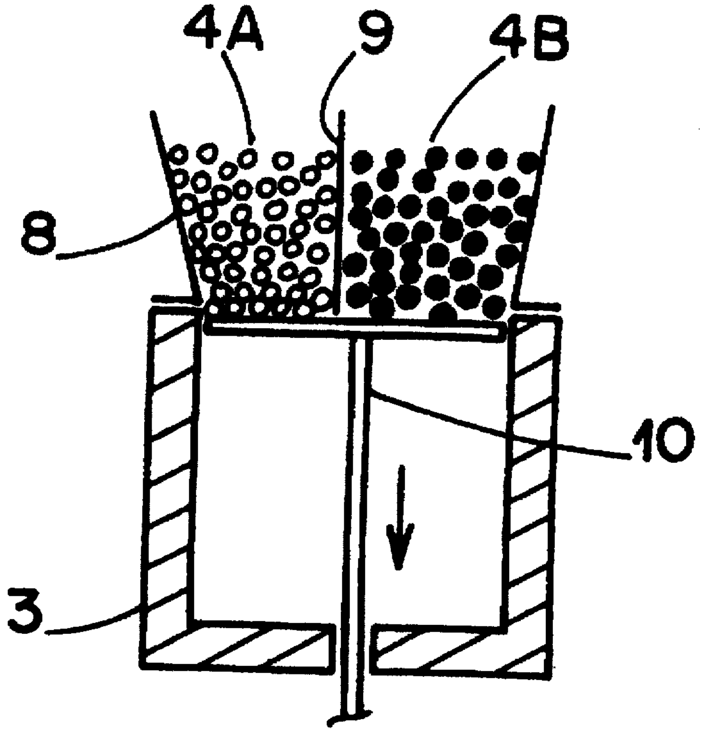
Figure 2B:
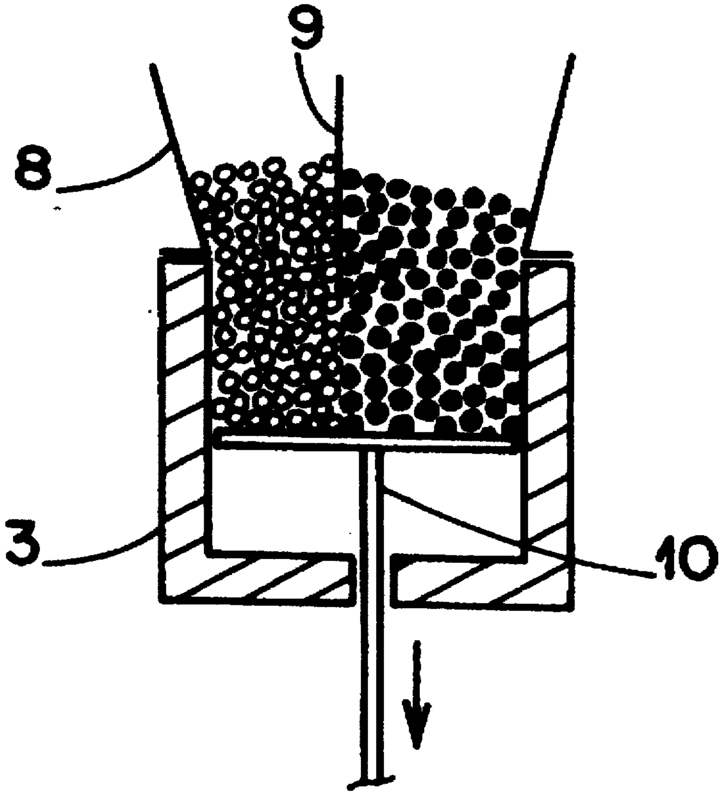

FIG. 2 shows, in a section along the compression axis, a variation of the phase of charging the mould from FIG. 1 with two powders, when particularly clean separation of the powders (thin junction) is desired, this variation involving the use of a moving base 10 which has descended less rapidly than the free flow (in the case in the drawing) of the powders 4A and 4B.

Figure 3A:
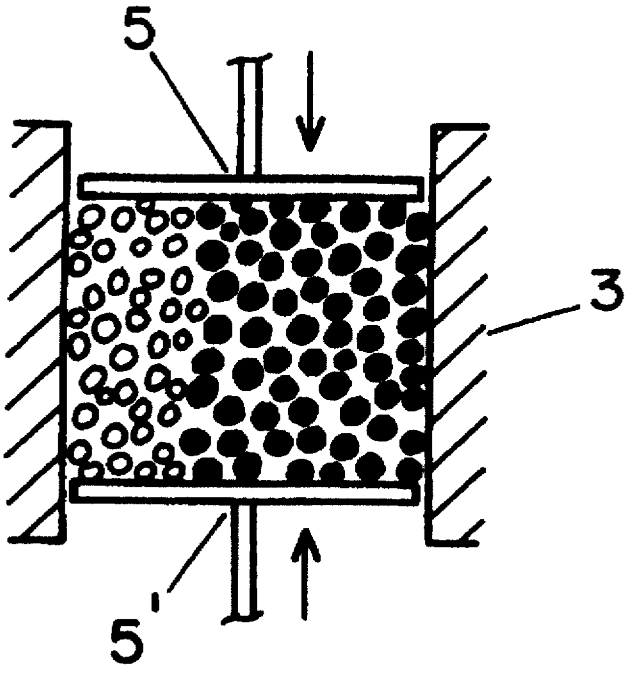
Figure 3B:
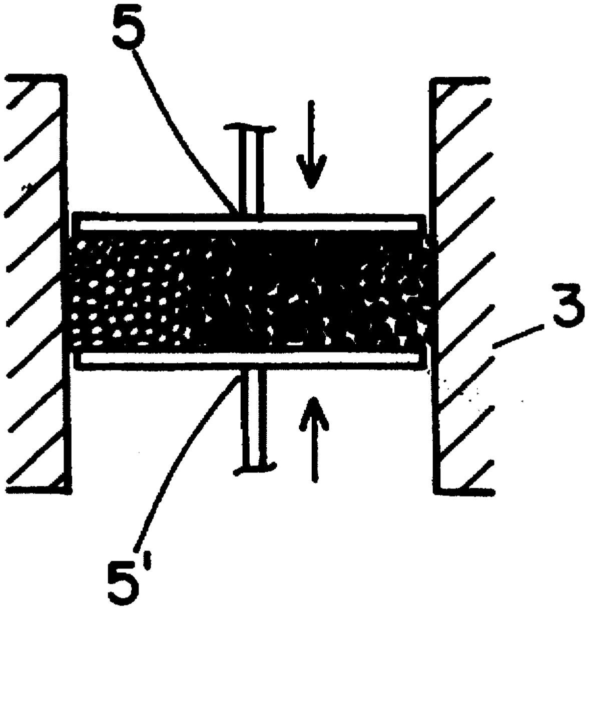

FIG. 3 shows, in a section along the compression axis, a device for filling a mould 3 which is open on both sides with compression by means of two pistons 5 and 5' both travelling relative to the mould so as to compress the powders 4A on both sides.

FIG. *4a* shows, as ordinate, the volumetric concentration of material A (fine line) and of material B (thick line) along a straight line perpendicular to the junction 1AB as abscissa as a function of the distance 1 which varies from 0 to L (L being the thickness of the two blocks 1A and 1B under consideration). The junction 1AB has a thickness designated Ej and is at a distance Lj from one edge of the block 1A taken as origin, the distance Lj corresponding to the abscissa of the point of equal volumetric concentration ($C_A=C_B$).

Figure 5:
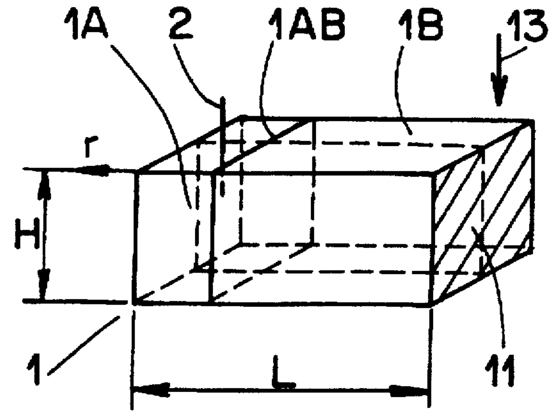
Figure 5A:
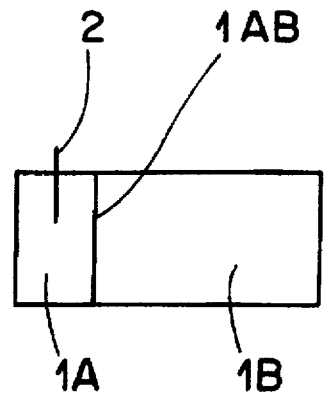

FIG. *4b* shows schematically, in a thick line, a typical curve giving the distance of Lj as a function of the height H of the junction 1AB (height corresponding to the compression direction). The rectangle shown in this figure corresponds to a section (FIG. *5a*) of the junction 1AB through a plane perpendicular to the junction 1AB and parallel to the compression axis 13 in FIG. 5. The variations of Lj are within a range ΔL. FIGS. 5 and *5a* show a brush 1 having two blocks (block 1A=fastening block, block 1B=wearing block) according to the invention with a junction 1AB parallel to the compression direction shown by an arrow 13. In all the perspective drawings of brushes (FIGS. 5, 6, 7, 8, 9 and *9b*), the wearing surface 11 has been shown by a hatched portion (=surface of contact with the commutator). The compression direction 13 is therefore parallel to this surface and perpendicular to the radial direction "r" defined relative to the commutator (not shown).

FIG. 5 is a perspective view of the brush, FIG. *5a* being an axial section of the same brush according to the rectangle in broken lines in FIG. 5.

The following figures, from 6 and *6a* to 9 and *9a*, have the same presentation as that in FIGS. 5 and *5a*.

Figure 6:
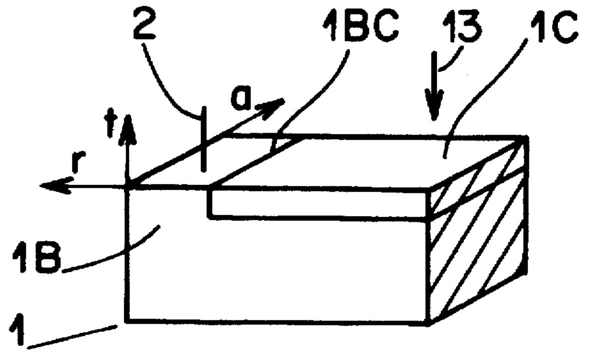

They differ in that:

FIGS. 6 and *6a* correspond to a brush having two blocks (L-shaped block 1B serving as a fastening block and wearing block and block 1C serving as a commutating block) with a junction 1BC which is parallel in part and perpendicular in part to the compression axis 13.

FIG. 6 and the following figures also show the directions a (axial), r (radial) and t (tangential) which conventionally define the orientation of a brush relative to the commutator—the plane "a–t" being the mean tangential plane of the brush and of the commutator. With the orientation a/r/t of the brush relative to the commutator shown in FIG. 6, the block 1C constitutes the trailing edge.

Figure 7:
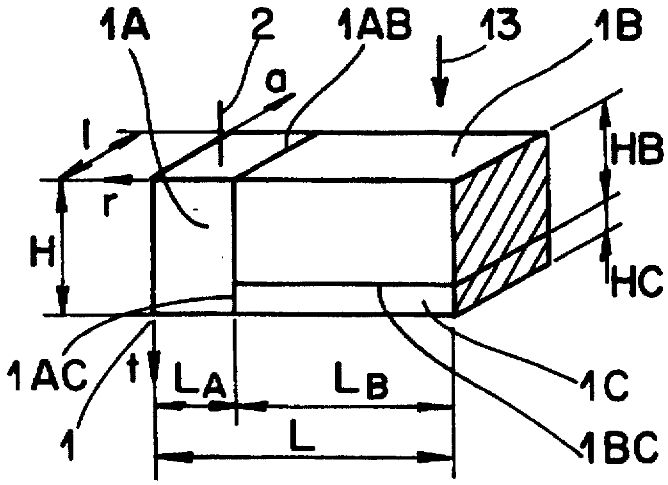
Figure 7A:
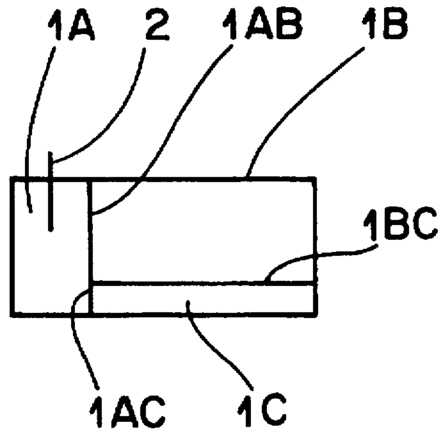

FIGS. 7 and 7*a* correspond to a brush having three blocks (fastening block 1A, wearing block 1B and commutating block 1C) formed from powders 4A, 4B and 4C respectively with two junctions 1AB and 1AC parallel to the compression axis 13 and one junction 1BC perpendicular to the compression axis 13.

Figure 8:
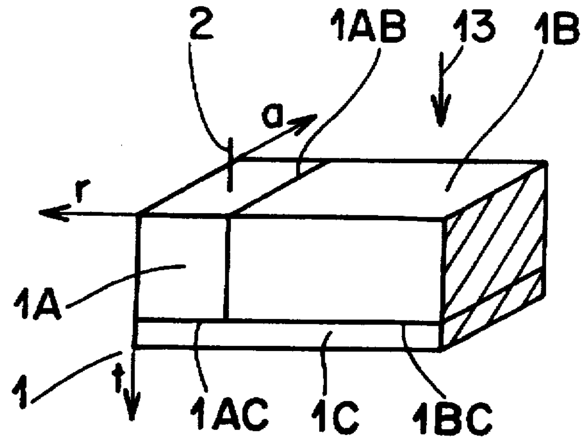
Figure 9:
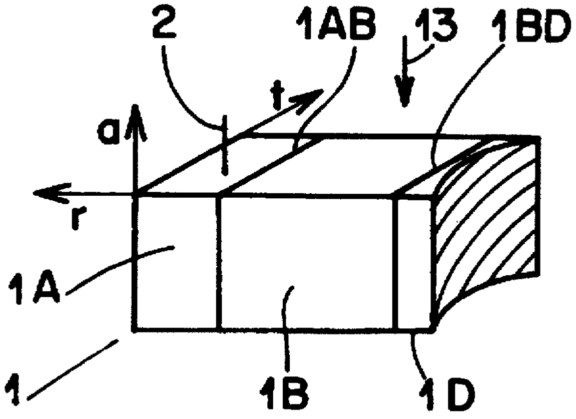
Figure 9A:
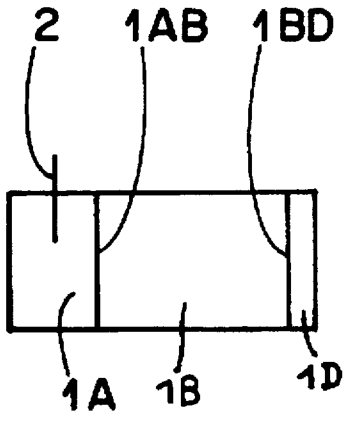
Figure 9B:
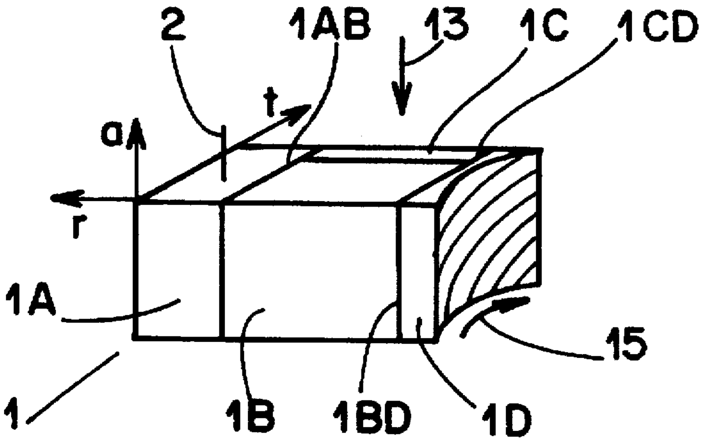

With the orientation a/r/t shown in FIG. 7, the block 1C also constitutes the trailing edge, as will also be the case in FIGS. 8 and 9*b*.

Figure 8A:
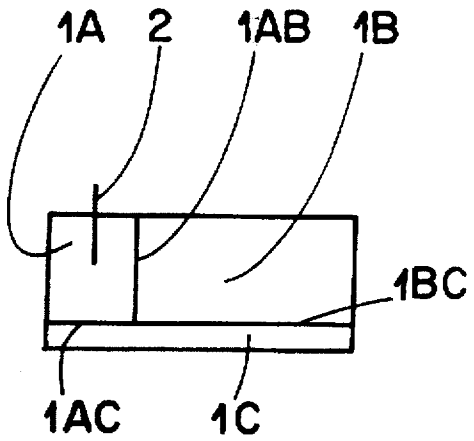

FIGS. 8 and 8*a* correspond to a different brush having three blocks (fastening block 1A, wearing block 1B and commutating block 1C) with a junction 1AB parallel to the compression axis 13 and a junction 1BC perpendicular to the compression axis 13.

FIGS. 9 and 9*a* correspond to a brush having three blocks (fastening block 1A, wearing block 1B and wiping block 1D) with two parallel junctions 1AB, 1BD, the block 1D serving as a wiping material and having the curvature of the commutator. FIG. 9*b* is similar to FIG. 9 but comprises a fourth block 1C (commutating block). This brush is obtained by means of a filling hopper 8 having four compartments.

Figures 10A, 10B, 10C:
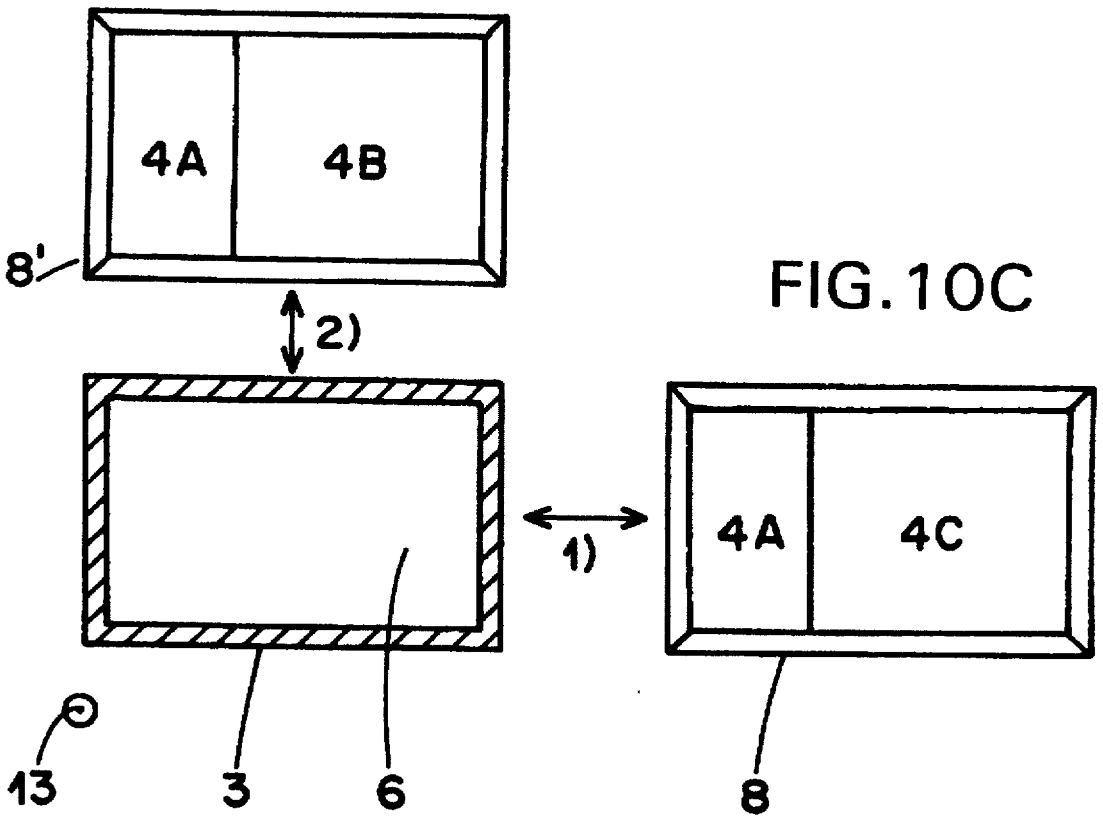

FIG. 10 is a plan view of the mould 3 showing the upper orifice 6 and two partitioned hoppers 8 and 8' respectively charged with powders 4A and 4C in the case of hopper 8 and with powders 4A and 4B in the case of hopper 8' which are used to produce the brush 1 in FIG. 7.

In this case and with regard merely to the charging of the mould: 1) some powder 4A and some powder 4C are introduced simultaneously through the hopper 8 (advance movement/charging/return=arrow 1); 2) some powder 4A and some powder 4B are then introduced simultaneously through the hopper 8' (advance movement/charging/return=arrow 2).

Figure 11:
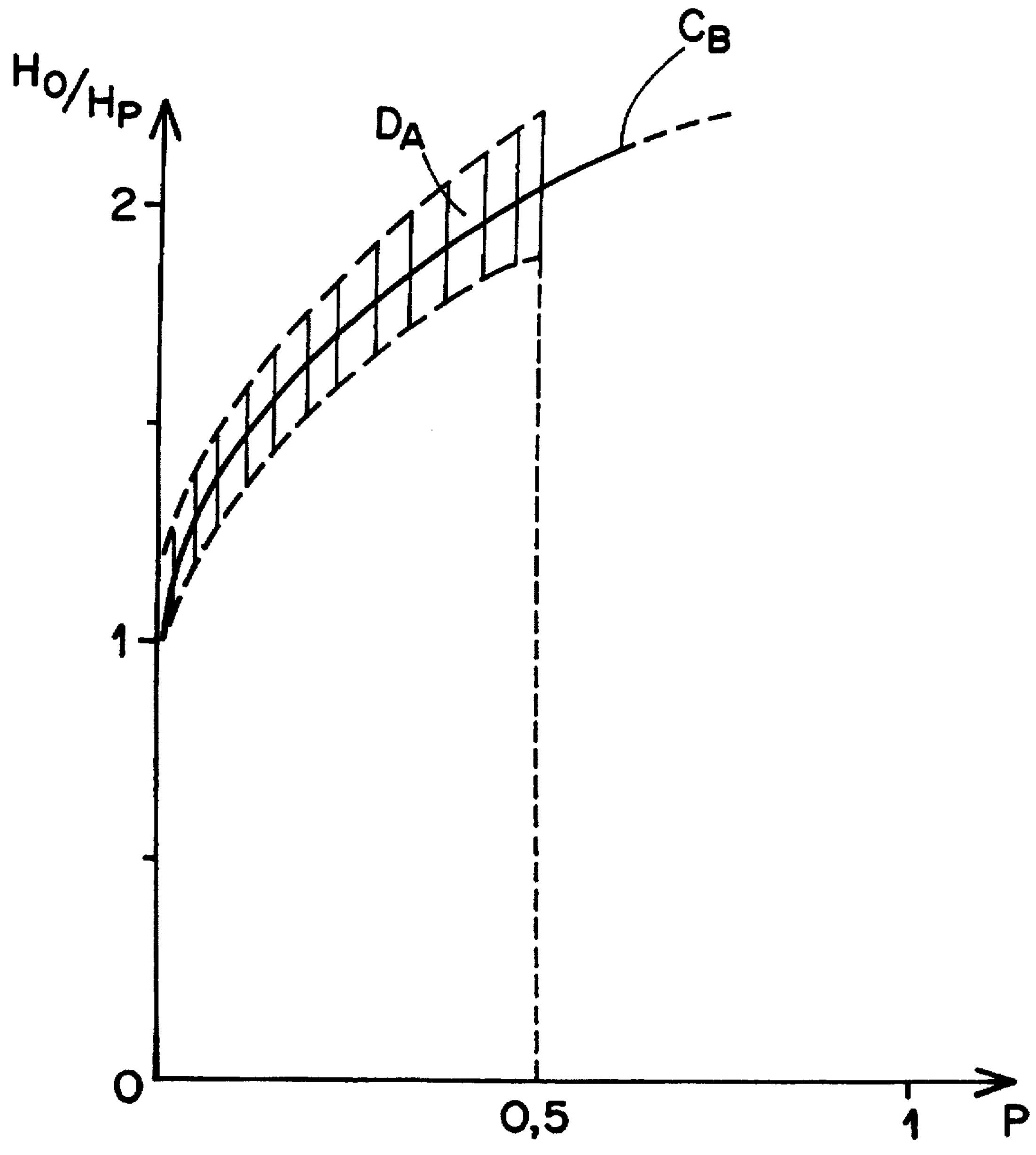

FIG. 11 shows a typical compression curve $C_B$ of a powder 4B in a solid line. This curve gives, as ordinate, the ratio Ho/Hp as a function of the pressure P exerted on the piston as abscissa (in tonne/cm$^2$–1 tonne/cm$^2$ is roughly equivalent to 10 MPa).

A hatched region $D_A$ limited by curves in broken lines and defined by the values of the curve $C_B$±10% and for P<0.5 tonne/cm$^2$ has been shown (region where the powders are able to yield during compression). Any powder 4A having a compressibility curve (for P<0.5 tonne/cm$^2$) contained in the region $D_A$ may be introduced simultaneously with the powder 4B so as to obtain quality brushes (substantially flat junction 1AB).

FIGS. 12*a* to 12*c* and 13*a* to 13*c* relate to the case where the fixing of the end of the electrical conductors takes place after manufacture of the brush itself. In this case, the brush is provided with means, typically a groove 14, optionally widened at one end, as in the case shown in FIGS. 13*a* to 13*c*. This groove 14 is obtained by means of a relief strip 16 formed on a lateral wall of the mould 3 in the case shown in FIGS. 12*a* to 12*c* or on the bottom of the mould in the case shown in FIGS. 13*a* to 13*c*.

Figure 12A:
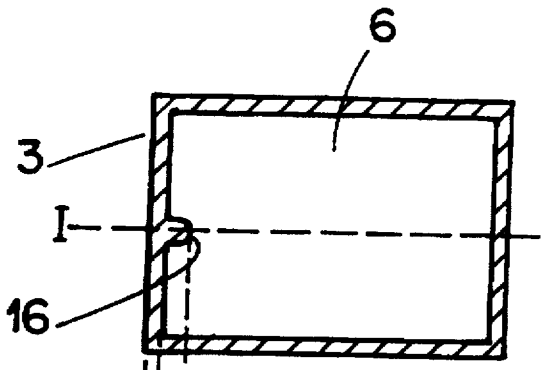
Figure 13A:
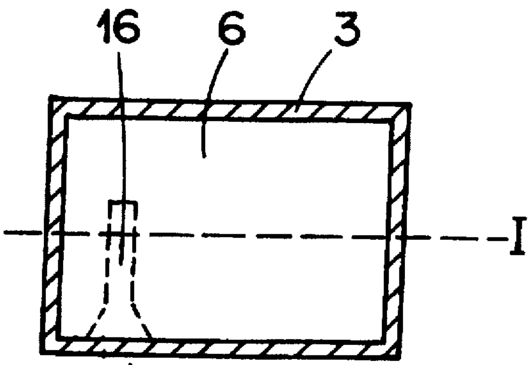
Figure 12B:
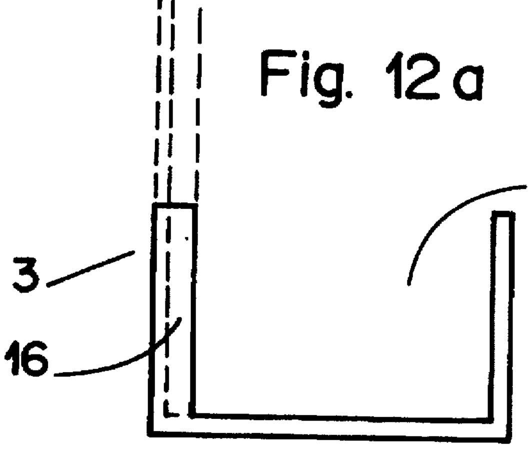
Figure 13B:
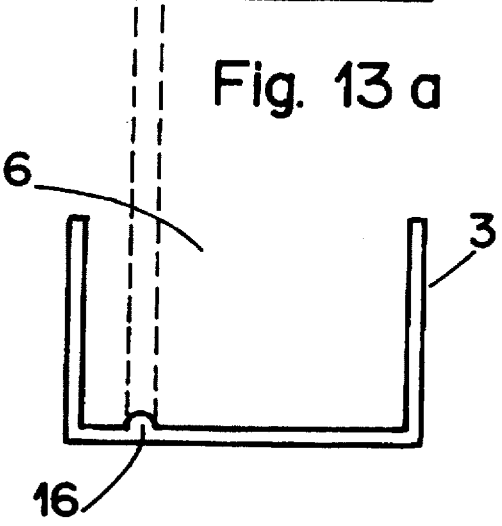

FIGS. 12*a* and 13*a* are plan views of the mould 3, FIGS. 12*b* and 13*b* are vertical sections along II from FIGS. 12*a* and 13*a*, FIGS. 12*c* and 13*c* are perspective views of the brushes 1 obtained by means of these moulds, the grooves 14 being located in the fastening block 1A by construction according to the invention.

DETAILED DESCRIPTION OF THE INVENTION

A first method of carrying out the process according to the invention involves keeping the filling front 17 of the mould 3 substantially flat throughout the phase of charging (or filling) with the powders, this being carried out while ensuring that there is the same volumetric flow per unit of surface area (section of the flux constituting the flow of powder through the upper orifice 6 of the mould for each powder 4A, 4B . . . ) introduced simultaneously.

In no case should the inclination of the filling plane 17 approach the limit inclination beyond which there is sliding of material and therefore a significant risk of mixing of the powders which is to be avoided.

Figure 4A:
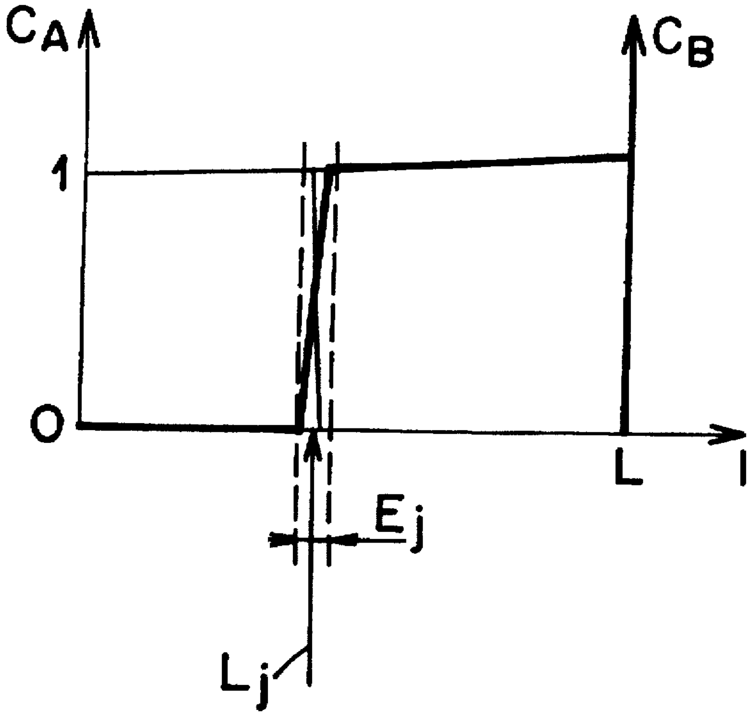
Figure 4B:
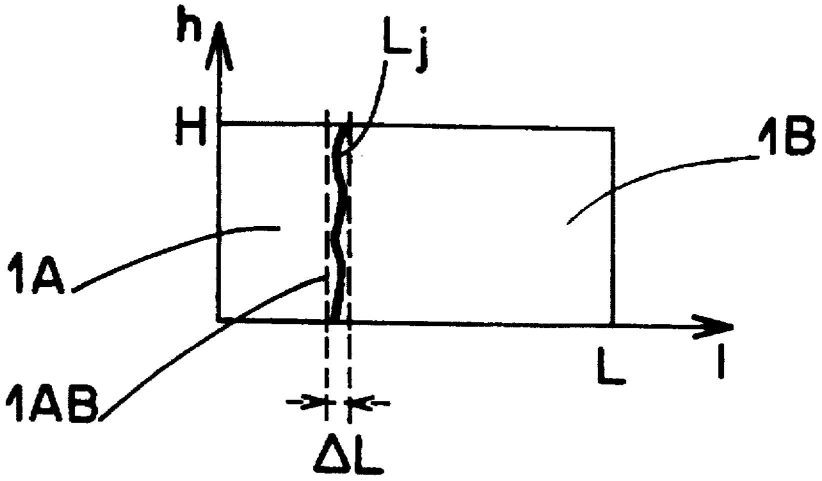

Furthermore, the applicants have found that the foregoing condition is not always sufficient to ensure production of quality brushes, in particular to obtain brushes of which the junctions 1AB between blocks 1A and 1B, in the case of junctions parallel to the direction of compression 13 and of height H at least equal to 2 mm are relatively flat, as illustrated in FIG. 4*b*.

Further to their tests, the applicants have found a complementary criterion allowing brushes having substantially flat junctions to be obtained. For this purpose, said simultaneously introduced powders have to have compressibility curves which do not vary by ±10% in the sphere of compressibility of the brushes where the powders can still yield.

This range of compressibility of the brushes generally extends to 0.5 tonne/cm$^2$ (about 5 MPa). Beyond 5 MPa and up to the final compression pressure which is generally between 10 and 60 MPa, the risk of the powders yielding becomes very slight or even disappears.

A flat junction also denotes the absence of a mechanical stress gradient between the two blocks separated by said junction, and this can only be favourable to the obtaining of rectilinear brushes, the risks of deformation and of yielding in particular during the heat treatment therefore being very limited.

This criterion of compressibility has been illustrated in FIG. 11:

- for a powder 4B having a given compressibility curve $C_B$ it is desirable to select as powder 4A to introduce simultaneously a powder of which the compressibility curve is in the range $D_A$ defined by the curve $C_B$±10%. According to the invention, the compressibility curves of powders 4A and 4B should be closer (at least in the "low pressure" range at the beginning of compression, where P<5 MPa), the greater the height H of the junction 1AB in the compression direction 13.

Thus, in the case of brushes of which the junction has a height greater than 5 mm in the compression direction 13, said simultaneously introduced powders preferably have compressibility curves which do not vary by ±5% in the range of compression of the brush defined by P<5 MPa.

With regard to the quality of the brushes 1 and more specifically with regard to the homogeneity of each block 1A, 1B . . . of a same compressed powder 4A, 4B . . . or the flatness of the junctions 1AB . . . separating two blocks 1A, 1B . . . , FIGS. 4*a* and 4*b* allow the process of the invention to be explained more clearly:

- on the one hand, as illustrated in FIG. 4*a* showing the variation in volumetric concentration $C_A$ and $C_B$ of the two powders 4A and 4B in a direction perpendicular to the junction 1AB between two blocks 1A and 1B, this junction is a boundary zone between these two blocks 1A and 1B of thickness Ej within which the powders 4A and 4B are mixed. It is important for this thickness Ej (>0 to obtain the mechanical strength of the junction) is low in the absolute value (less than a few mm) and typically lower, on average, than 0.2.L and preferably 0.1.L, L being the total thickness of the blocks 1A and 1B taken perpendicularly to the junction 1AB under consideration.

on the other hand, as illustrated in FIG. 4*b*, it is important for this junction 1AB not to be "undulating" with a variable distance Lj (Lj=distance between the junction and one of the sides of the block 1A taken as origin in the case of FIG. 4*b*) otherwise there will be significant variations in performance. It is therefore important for this junction 1AB to approach a plane and for the small local variations to be within relatively small limits ΔL. According to the invention, ΔL is smaller than 0.2.L and preferably smaller than 0.1.L.

The mean values of Ej and ΔL will also depend on the method of simultaneously introducing at least two powders into the mould.

According to a first embodiment of the invention relating to the simultaneous charging of the powders, said powders 4A . . . are introduced by gravity into said mould 3 using a hopper 8 equipped with at least one separating partition 9 of which the bottom end is generally level with the upper orifice 6 of the mould 1.

The hopper 8 may be designed so that said partition 9 may be displaced in a horizontal plane to allow the relative proportion (by volume) of each of said simultaneously introduced powders to be modified if necessary.

According to a second embodiment of the invention which is preferred if a junction 1AB which is as narrow and as flat as possible is desired, said mould 3 comprises a movable base 10 positioned at the level of said upper orifice 6 at the beginning of charging (or filling) of said mould and descending as said powders are introduced by gravity or by forced feed, the powders optionally being stored in a hopper 8 equipped with a separating partition 9 reaching the level of said upper orifice 6 of the mould or supplied by means of feed tubes having a cross section corresponding to that of said blocks to be obtained.

According to this embodiment, there is no free fall due to gravity of different powders from a storage hopper to the base of the mould or to the filling plane 17 as in the previous embodiment but an overall flux consisting of at least two parallel fluxes which follows the movable base of the mould so as to produce a "piston" type flow without a pressure gradient between the various fluxes of powders constituting this overall flux so as to obtain a flat junction (no yielding of material from one block to an adjacent block).

It is also possible to produce, for each flux of powder to be introduced simultaneously, a forced feed ("piston" type flow) by subjecting the displacement of the movable base to said forced feed so as to keep the pressure resulting from the forced feed substantially constant and at a low level.

Furthermore, the invention provides a large number of variations in process:

On the one hand, it is possible to introduce more than two conductive powders simultaneously and thus to obtain a brush having at least two junctions parallel to the compression direction, this being useful, as shown in FIG. 9, if the brush is to be provided with a wiping block 1D in addition to the wearing blocks 1B and fastening blocks 1A.

Furthermore, it is possible to charge (or fill) said mould by a first simultaneous introduction of at least two powders followed by at least one second simultaneous introduction of at least two powders, as is the case when producing the brush according to FIG. 7 where the powders 4A and 4C are firstly introduced simultaneously and then the powders 4A and 4B simultaneously.

Finally, the charging of said mould can include, in addition to at least one simultaneous introduction of at least two powders forming parallel flows, the introduction into the mould, before or after said simultaneous introduction, of a powder which may or may not differ from the powders introduced (or to be introduced) simultaneously so as also to form a junction perpendicular to the compression direction.

Thus, to obtain the brush from FIG. 6, some powder 4B is firstly charged, then simultaneously powder 4B and powder 4C. Similarly, to obtain the brush from FIG. 8, the powder 4C is firstly charged then simultaneously powder 4A and powder 4B—but charging in the reverse sequence would obviously also be possible.

With regard to the fixing of the ends of the electrical conductors 2 to the brushes 1, two methods may be adopted:

On the one hand said electrical conductors 2 may be introduced according to the invention into said conductive powders by means of said piston 5 during said simultaneous compression of the mould contents so as to benefit from said compression in order to fasten said conductor to one of the blocks of the brush (generally the fastening block 1A).

On the other hand, it is also possible to produce brushes according to the invention which are free from electrical conductors, then to fix the ends of said electrical conductors 2 by soldering or brazing said ends to said brushes 1 or to the fastening blocks 1A provided, said brushes or said fastening blocks preferably comprising a fastening means 14 (groove, hole . . . ) intended to receive said ends so as strongly to connect said brushes 1 and said electrical conductors 2.

In fact, it may be necessary for the brush manufacturer to provide brushes which are free from electrical conductors because these brushes, contrary to those equipped with electrical conductors, can easily be used on an automatic assembly machine as they can easily be positioned as a unit, typically by means of vibrating dishes and a bulk supply. Once the brush has been positioned, it is easy to fix the end of an electrical conductor 2 completely automatically on the brush 1 then to mount the brush equipped with its electrical conductor on the motor more or less automatically.

Thus, depending on the customer's level of automation or depending on the rates required, it may be more advantageous to provide brushes 1 which are free from electrical conductors 2 than brushes equipped with electrical conductors, in the knowledge that brushes equipped with electrical conductors are, in many cases (depending on the length and rigidity of the electrical conductors), separated from one another by hand, giving rise to a high cost which is sometimes higher than the price of the brush itself.

All these means according to the invention allow the production of composite brushes 1 consisting of integral blocks 1A, 1B . . . each having a specific function owing to their nature and their position in the brush relative to the position of the brush with respect to the commutator (position defined by a/r/t).

The process according to the invention allows the production of a first family of brushes:

a composite brush 1 is formed having at least two blocks, one 1B serving for the function of wear and the other 1A serving for the function of fastening or electrical connection of the end of said electrical conductor 2 by simultaneously introducing into the mould a so-called wearing powder 4B capable of forming a wearing block 1B providing contact with said commutator and a so-called fastening powder 4A capable of forming a block 1A for fastening said electrical conductor 2.

FIGS. 5 and 5*a*, 12*c* and 13*c* show this type of brush.

Such a separation of the functions schematically designated by "fastening" and "wear" is technically advantageous insofar as it allows each function to be optimised. For example, the fastening block 1A should allow a slight voltaged drop at the junction between the fastening block 1A and the end of the electrical conductor 2—this property not being relevant for the wearing block 1B which itself has to satisfy other specific technical requirements. Such a separation of the functions is economically advantageous because the applicants' tests have demonstrated that the fastening powder 4A intended to form the fastening block can comprise an economic or reclaimed powder, originating in particular from the machining of brushes.

It is particularly advantageous for simultaneously reducing the solid waste and the cost prices to select a reclaimed powder and/or optionally other powders which are more economical than those which would be used if the fastening and wearing functions were not separated.

In practice, the following procedure is adopted for recycling reclaimed powders (or cheap powders):

a) a batch of wearing powder 4B intended to form said wearing block 1B is provided for a given family of brushes for a specific application and a batch of said reclaimed powder, b) compressibility curves are plotted for the wearing powder 4B and said reclaimed powder, c) the compressibility curve of said reclaimed powder is adjusted by incorporation either of a so-called sparingly compressible powder or of a so-called compressible powder, as the case may be, for obtaining a fastening powder 4A having final compressibility close to that of said powder 4B (deviation lower than ±10% or preferably lower than ±5% in cases which are more demanding in terms of flatness of the junction). See FIG. 11.

Said sparingly compressible powder is a metal powder in the form of solid grains (sparingly cut grains, low ratio of large dimension to small dimension of the grain,) preferably based on Cu, Fe, said compressible powder is either a metal powder having cut grains (dendritic grains), preferably based on Cu, or a generally conductive powder of carbonaceous material. Typically, said sparingly compressible powder is formed from particles having an average size greater than 60 μm whereas said compressible powder is formed from particules having an average size smaller than 60 μm.

These so-called sparingly compressible or compressible powders are commercially available powders.

Thus, brushes 1 are obtained which comprise at least two integral blocks separated by at least one junction parallel to the compression direction of said brush:

a wearing block 1B intended to produce contact with the commutator of which the contact surface 11 is parallel to the compression direction 13 of said brush, a fastening block 1A of said electrical conductor 2 incorporating said reclaimed powders.

The process according to the invention allows the production of a second family of brushes in which said wearing block 1B also comprises a so-called commutating block 1C obtained by compression of a so-called commutating powder 4C (at most half as conductive as the wearing powder 4B)—so as to form a commutating block 1C constituting the trailing edge of the brush, the junction 1BC between said wearing block 1B and said commutating block 1C preferably being perpendicular to the compression direction 13, denoting that the wearing powder 4B forming the wearing block and the commutating powder 4C forming the commutating block are preferably introduced successively into the mould.

FIGS. 7 and 7*a*, 8 and 8*a*, and 9*b* illustrate variations of brushes provided with a commutating block 1C: in the case shown in FIGS. 7 and 7*a*, 8 and 8*a*, the wearing powders 4B and commutating powders 4C are not introduced simultaneously into the mould. On the contrary in the case shown in FIG. 9*b*, the commutating powder 4C is introduced at the same time as the wearing powder 4B and the fastening powder 4A and wiping powder 4D, allowing for the curvature of the wiping block 1D and the location of the commutating block 1C which has to form the trailing edge.

Figure 6A:
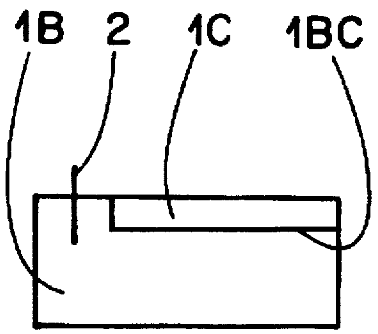

FIGS. 6 and 6*a* show a further variation of brush 1 equipped with a commutating block 1C:

in this case the same wearing powder 4B serves to produce the wearing block 1B and the fastening block 1A which form a single L-shaped block. This variation, which is not economical as it does not involve the recycling of reclaimed powders (according to the invention there are no reclaimed powders in the wearing block, for reasons of quality) is a possible but not preferred embodiment of the invention.

Finally, as may be seen in FIGS. 9 and 9*a*, the brush 1 according to the invention can also comprise a so-called wiping block 1D integral with said wearing block 1B and optionally also said commutating block 1C, as shown in FIG. 9*b*. This wiping block 1D is obtained by compression of a so-called wiping powder 4D, said wiping block 1D being able to have the curvature of the commutator, being intended to accelerate wiping and to form the patina of the commutator during commissioning of the electric motor and adapting itself rapidly so as to form a friction face acting on almost the entire friction surface, the junction 1BD between said wearing block 1B and said wiping block 1D preferably being parallel to the compression direction 13.

There are in fact spheres which demand the delivery to the customer of an already wiped motor so that the motor is stable in performance (power) and with respect to disturbances (noise) from start-up. This involves a wiping phase at the motor manufacturers, this phase advantageously being shortened by means of brushes equipped with a wiping block 1D.

All the brushes obtained by the process according to the invention constitute a second object of the invention which, in view of the large number of possible combinations within the scope of the invention, is not limited to the brushes illustrated in the drawings or described in the examples. If all the main functions mentioned of the corresponding blocks of a brush according to the invention are summarised, there are found:

a wearing block 1B obtained from an electrically conductive mixture containing a metal powder, a graphite powder, a binder and additives, the resistivity (rho) being adapted to the final destination of the brush by acting in particular on the content of metal powder, a commutating block 1C obtained from a mixture similar to the one leading to the wearing block 1B but having a composition which is selected for obtaining resistivity which is at least twice that of the wearing block 1B, a fastening block 1A obtained from a mixture similar to that leading to the wearing block 1B but the graphite powder being able to be replaced by an economical or reclaimed powder and the resistivity is selected at most equal to that of the wearing block, a wiping block 1D obtained from a mixture similar to that leading to the wearing block 1B but the powders and (reduced) binder content being selected so that the hardness of the wiping block is lower than that of the wearing block (typically half).

Generally speaking, from a reference value of $rho_B$ (resistivity of the wearing block 1B) which is variable according to the applications (for example $rho_B$ is of the order of 2000–3000 μΩ.cm in the case of petrol pump brushes, but of the order of 100 000 μΩ.cm in the case of electric drill brushes), the values of rho are determined for the other blocks 1A, 1C, 1D . . . :

the value of $rho_A$ of the fastening block 1A is at most equal to that of $rho_B$ and usually much lower than that of $rho_B$. On the other hand the value of $rho_C$ of the commutating block 1C is higher (generally 2 to 3 times higher) than that of $rho_B$.

With regard to the value of $rho_D$ of the wearing block 1D, its value is close to that of $rho_B$, the essential difference between the wearing blocks 1B and wiping blocks 1D being a difference in hardness, as already mentioned, the wiping block 1D being softer than the wearing block 1B.

As already mentioned, the constituents of each type of powder 4A, 4B, 4C . . . , the formulation of each type of powder are known as such to the skilled person who knows how to vary the composition of a powder, to adapt the content of each powder constituent so as to obtain the desired resistivity value (rho) by altering, in particular, the content of the most conductive materials (copper powders) or to obtain a more or less soft block by altering the more or less great content of binder. In fact, brush manufacturers generally have several hundreds or thousands of formulations which cover virtually the entire range of resistivity and hardness encountered in brushes.

The powders (metallic or carbonaceous, essentially graphite), binders and additives used to produce brushes are known as such to a skilled person. Phenolic resins may be mentioned as binders used. Lead, molybdenum sulphide which promotes the sliding of the brush on the commutator may be mentioned as additive.

The brushes according to the invention necessarily comprise two distinct blocks with a junction parallel to the compression direction, always a wearing block 1B and usually a fastening block 1A. However, when the fastening block and wearing block are combined—as shown in FIG. 6—the second block is a commutating block 1C.

However, the process according to the invention is not limited to the production of brushes merely provided with the above-mentioned function. In fact, the process according to the invention does not limit the number of successive charges of powders or the nature of these powders in relation to their function or the actual geometry of each final block. It therefore easily allows the incorporation of any additional function.

Similarly, even though it is generally preferable for the brush 1 to be directed relative to the commutator such that the compression direction 13 of the brush is perpendicular to the radial direction r, the invention does not prevent the brushes according to the invention from being used, in certain cases and in view of the great diversity of conditions of use of the brushes, without a major drawback with a compression direction parallel to the radial direction r.

EXAMPLES

All the figures and, with regard to the brushes themselves, more particularly FIGS. 5 to 9*b* constitute examples of the invention.

Example 1

Brushes for 12 V starter motors were produced in accordance with FIGS. 7 and 7*a* in the following dimensions:

L=23 mm ($L_A$=7 mm/$L_B$=16 mm)

H=10 mm ($H_B$=8 mm/$H_C$=2 mm)

l=20 mm

For this application, the desired resistivity values (rho) for each block are:

wearing block 1B: $rho_B$ of the order of 50 μΩ.cm fastening block 1A: $rho_A$ of the order of 30–50 μΩ.cm commutating block 1C: $rho_C$ of the order of 300 μΩ.cm A) The powders used:

The mixture of powders forming the wearing powder 4B of this test series contains:

copper powder having solid grains with a specific surface area of 1800 $cm^2$/g and a mean particle size of 100 μm (65% by weight), natural graphite powder (flakes of about 200 μm per 10 μm thickness) (20% by weight), a binder (phenolic resin) (10% by weight), additives ($MoS_2$, lead . . . ) (5% by weight in total).

The other mixtures of powders may be deduced from this, with the corrections applying to each type of powder (rho value, hardness, recycling of the reclaimed powder):

reclaimed powder was used for the fastening powder 4A instead of copper and graphite powders and the compressibility (compressibility deviation less than 5% because junction height H>5 mm) and the value of rho were adapted by means of copper metallic powders.

It should be noted that, in other cases, it may possibly have been necessary to use graphite powders or even non-conductive carbonaceous powders if necessary.

the resistivity of the wearing powder 4B is increased for the commutating powder 4C using half the amount of copper powder (the amount of graphite powder is increased accordingly).

the hardness of the wiping powder was reduced using about half the amount of binder.

B) Brush production:

A mould of the type having a movable base 10 was used for the tests, its section being 20×23 (mould with final dimensions, taking into consideration the previously measured baking shrinkage) and its depth 40 mm, supplied by two hoppers 8 and 8', as shown in FIG. 10, each equipped with a partition 9 of which the position allows the formation of the junctions 1AC and 1AB.

Some fastening powder 4A and some commutating powder 4C were firstly charged simultaneously over 6 mm of height using the first hopper 8 then fastening powder 4A and wearing powder 4B simultaneously over 24 mm of height using the second hopper 8'. The total height Ho is 30 mm.

All of these powders were then compressed with a piston 5 equipped with an orifice through which the end of a copper braid 2 passes (over about 5 mm).

A pressure of about 4 t/$cm^2$ (that is about 40 MPa) was applied for obtaining a crude brush having a final height Hp close to just above 10 mm.

The crude brushes obtained were then subjected to a heat treatment at 600° C. in a reducing atmosphere for 30 minutes in a passage furnace. This treatment has a multiple role:

polymerization, then carbonization of the binder, sintering of the metal powders, etc. The brushes were then machined to the final dimensions (H=10 mm, L=23 mm, l=20 mm).

Tests were also carried out in which the order of filling was reversed:

powders 4A and 4B were firstly introduced at the same time with the hopper 8' then the powders 4A and 4C with the hopper 8.

All of the brushes shown in FIGS. 5 to 9*b* were produced with this same mould.

In the case of the brush shown in FIG. 9*b*, the wiping block 1D was obtained from a wiping powder 4D similar to the wearing powder 4B but with half the amount of binder (binder replaced by graphite powder).

All these brushes were tested with regard to their mechanical properties (strength of the brushes and mechanical connection between blocks of a single brush), electrical properties and on the engine test bench. They had the expected properties in all these respects, allowing for their different structures, the properties being at least as good as those of the prior art products which had the same functions (fastening/wear/connection/wiping), generally separately and not necessarily with the good orientation (compression direction 13 not necessarily perpendicular to direction r as in the invention).

Furthermore, the sections produced on the various junctions, parallel or perpendicular to the compression direction 13, confirmed the quality of the brushes and demonstrated the small thickness of the junction (Ej less than 2 mm) and the good flatness of each junction (ΔL less than 2 mm).

Example 2

A second series of tests was carried out which differed from the previous tests in that the electrical conductors 2 were not fixed to the brushes during the compression stage but by brazing after final machining.

Figure 12C:
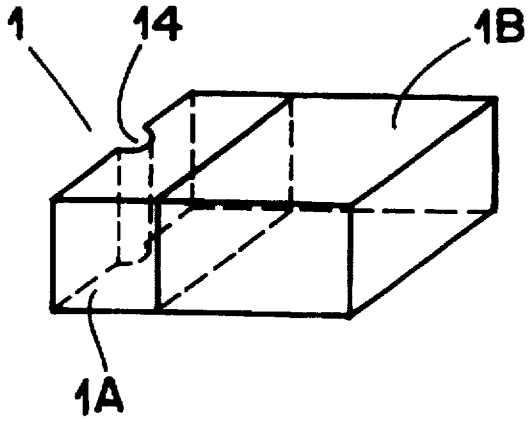
Figure 13C:
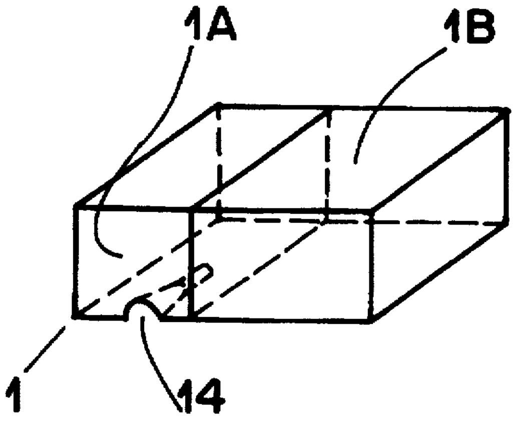

During these tests, moulds adapted for obtaining grooved brushes 14 were used, the moulds like those shown in FIGS. 12*a* and *b*, 13*a* and *b*, for obtaining brushes as shown in FIGS. 12*c* and 13*c*.

This variation of the process according to the invention allowed a heat treatment to be carried out at a higher temperature (900° C.) than in the first series of tests where the heat treatment temperature is limited by the presence of an electrical conductor made of copper (braided or stranded cable) of which the mechanical characteristics have to be maintained.

Thus, this rise in the heat treatment temperature allowed the spread of usable powders to be broadened and, in particular, allowed economical powders such as iron powders to be used, in particular for the production of the fastening block 1A.

Variations of brushes in which all or part of the fastening block is obtained from copper powder and consists of sintered copper powder were also produced, leading, when associated with the presence of grooves 14 or optionally of holes, to a very strong fastening of the end of the electrical conductor 2 and of the brush 1 by soldering/brazing.

The orientation of the grooves 14 or of the holes will obviously depend on each application since, for a given application, there may exist an optimum position in which the risk of breakage of the electrical conductor will be minimised, allowing for the vibrations of the motor. Furthermore, it may be advantageous for this purpose for the groove 14 to be flared at its external end as shown in FIG. 13*a*.

ADVANTAGES OF THE INVENTION

The great possibilities of the invention should firstly be emphasised with regard to the diversity of design of the brushes insofar as the concept developed in the invention opens up the way to virtually any production of composite brushes having at least two blocks.

The process according to the invention therefore allows the qualities of performance which would generally be found in different brushes in the prior art to be combined in a single brush. This process allows manufacturers to offer an enormous range of brushes and—owing to the rapidity of adaption of the process—to satisfy the customers' latest requirements. Furthermore, this process is completely open to future developments aimed at the integration of new functions in the non-limiting functions mentioned here.

With regard to the economic aspect, the possibility either of recycling or of using powders (reclaimed powders) having almost zero value (or possibility a negative value) or a low value leads to a significant reduction in the cost price which, in certain cases, can range from 5 to 15%, this being significant for a product forming the object of mass production.

Furthermore, it is not necessary to emphasize to a manufacturer the economic (and ecological) value in recycling his own waste (powder or cuttings resulting from the production of brushes and more specifically the final machining of the brushes).

Finally, the invention allows the production of brushes without electrical conductors but capable of receiving them under automatic production conditions, in particular on the customers' own assembly line, and capable of forming a fastening which is substantially as resistant to vibrations as the one obtained when the end of the electrical conductors is introduced during compression of the powders.

APPLICATION

The invention may be applied to the production of any type of brushes.

What is claimed:

1. A composite electrical contact brush comprising a first integral block of a first electrically conductive compressed powder and a second integral block of a second electrically conductive compressed powder in contact therewith along opposite block faces comprising a junction therebetween, said junction comprising a zone in which said first and second powders are mixed and including an interface $L_j$ at which said first and second powders are of equal volumetric concentration, said junction having a thickness $E_j$ which is less than 0.2 L, where L is the length of the brush in a direction perpendicular to the junction.

2. A brush according to claim 1, wherein $E_j$ is less than 0.1 L.

3. A brush according to claim 1, wherein the interface $L_j$ varies in position along the length by an amount ΔL which is less than 0.2 L.

4. A brush according to claim 3, wherein ΔL is less than 0.1 L.

5. A brush according to claim 1, wherein said first and second blocks are of different electrically conductive powders.

6. A brush according to claim 5, wherein said first and second integral electrically conductive blocks differ in resistivity.

7. A brush according to claim 5, wherein said first and second integral electrically conductive blocks differ in hardness.

8. A brush according to claim 1, wherein said first block is a wearing block for contacting a commutator, and said second block is a fastening block for connection to an electrical conductor.

9. A brush according to claim 8, additionally comprising a commutating block in contact with said wearing block and said fastening block along opposite block faces comprising a junction therebetween.

10. A brush according to claim 9, wherein said junction between the commutating block and the wearing block and fastening block is perpendicular to the junction between the wearing block and the fastening block.

11. A brush according to claim 9, wherein said junction between the commutating block and one of the wearing block or fastening block is perpendicular to the junction between the wearing block and the fastening block, and said junction between the commutating block and the other of the wearing block and fastening block is parallel to the junction between the wearing block and the fastening block.

12. A brush according to claim 8, additionally comprising a wiping block adapted for contacting a commutator and contacting said wearing block along opposite faces thereof comprising a junction therebetween.

13. A brush according to claim 12, wherein said wiping block has a face opposite said junction with the wearing block which is curved in adaptation to a commutator, so as to facilitate wiping of the brush.

14. A brush according to claim 9, additionally comprising a wiping block adapted for contacting a commutator and contacting said wearing block and said commutator block along opposite faces thereof comprising a junction therebetween.

15. A brush according to claim 14, wherein said wiping block has a face opposite said junction with the wearing block which is curved in adaptation to a commutator, so as to facilitate wiping of the brush.

16. A brush according to claim 1, wherein portions of said junction are perpendicular to each other.

17. A brush according to claim 1, wherein said first and second blocks comprise non-spherical particles partially oriented parallel to said junction.

18. A brush according to claim 9, wherein said first and second blocks comprise non-spherical particles partially oriented parallel to said junction.

19. A brush according to claim 12, wherein said first and second blocks comprise non-spherical particles partially oriented parallel to said junction.

20. A brush according to claim 16, wherein said first and second blocks comprise non-spherical particles partially oriented parallel to said junction.

* * * * *